(12) United States Patent
Lin et al.

(10) Patent No.: US 8,810,663 B2
(45) Date of Patent: Aug. 19, 2014

(54) METHODS FOR MOTION CORRECTION FOR HIGH-DYNAMIC-RANGE IMAGING SYSTEMS

(75) Inventors: Peng Lin, Pleasanton, CA (US); Lingtao Jiang, San Jose, CA (US); Scott Smith, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 474 days.

(21) Appl. No.: 13/112,964

(22) Filed: May 20, 2011

(65) Prior Publication Data

US 2012/0194686 A1 Aug. 2, 2012

Related U.S. Application Data

(60) Provisional application No. 61/436,952, filed on Jan. 27, 2011.

(51) Int. Cl.
*H04N 5/228* (2006.01)
*H04N 5/235* (2006.01)
*G06K 9/40* (2006.01)

(52) U.S. Cl.
USPC ............ 348/208.12; 348/229.1; 382/254

(58) Field of Classification Search
USPC .......... 348/229.1, 208.99, 208.1–208.6; 382/254, 274, 276, 294
See application file for complete search history.

(56) References Cited

U.S. PATENT DOCUMENTS

| | | | |
|---|---|---|---|
| 7,072,398 B2 * | 7/2006 | Ma | 375/240.16 |
| 7,239,805 B2 | 7/2007 | Uyttendaele et al. | |
| 2008/0291296 A1 * | 11/2008 | Oike | 348/234 |
| 2009/0268055 A1 * | 10/2009 | Hamilton et al. | 348/230.1 |
| 2010/0091119 A1 * | 4/2010 | Lee | 348/208.4 |
| 2010/0157079 A1 * | 6/2010 | Atanassov et al. | 348/222.1 |
| 2010/0259626 A1 | 10/2010 | Savidge | |
| 2011/0069200 A1 * | 3/2011 | Oh et al. | 348/229.1 |

OTHER PUBLICATIONS

Gyaourova, "Block matching for object tracking" Oct. 14, 2003 [Retrieved on May 18, 2011]. Retrieved from the Internet: https://computation.llnl.gov/casc/sapphire/pubs/UCRL-TR-200271.pdf.
Lin et al., U.S. Appl. No. 13/110,252, filed May 18, 2011.

* cited by examiner

*Primary Examiner* — Kelly L Jerabek
(74) *Attorney, Agent, or Firm* — Treyz Law Group; Kendall P. Woodruff (57) ABSTRACT

Electronic devices may include image sensors and processing circuitry. Image sensors may be used to capture multiple exposure images. Processing circuitry may be used to combine multiple exposure images into high-dynamic-range images. A motion correction method is provided that detects motion between multiple exposure images without using a frame buffer. A noise model is used to separate noise from motion for more accurate motion detection. A dilation operator may be used to enlarge a motion mask generated by the motion detector. Motion-corrected images may be generated from the multiple exposure images using a soft switch based on the motion strength. Motion-corrected multiple exposure images may be combined to generate a motion-corrected HDR image. A smoothing filter may be applied to the motion region of the motion-corrected HDR image. A blooming correction may be used to eliminate color artifacts in the motion-corrected HDR image.

20 Claims, 6 Drawing Sheets

METHODS FOR MOTION CORRECTION FOR HIGH-DYNAMIC-RANGE IMAGING SYSTEMS

This application claims the benefit of provisional patent application No. 61/436,952, filed Jan. 27, 2011 which is hereby incorporated by reference herein in its entirety.

BACKGROUND

The present invention relates to imaging devices and, more particularly, to imaging devices with image sensors that may be used to produce high-dynamic-range images.

Image sensors are commonly used in electronic devices such as cellular telephones, cameras, and computers to capture images. In a typical arrangement, an electronic device is provided with a single image sensor having an array of pixels and a single corresponding lens. Some electronic devices use arrays of image sensors and arrays of corresponding lenses.

In certain applications, such as when acquiring still or video images of a scene with a large range of light intensities, it may be desirable to capture high-dynamic range images. While highlight and shadow detail may be lost using a conventional image sensor, highlight and shadow detail may be retained using image sensors with high-dynamic-range capabilities.

Common high-dynamic-range (HDR) imaging systems use a multiple exposure (ME) image capture method. In a ME method, multiple images are captured by the image sensor, each image having a different exposure time. Short-exposure images may retain shadow detail while long-exposure images may retain highlight detail. In a typical device, pixels from short-exposure and long-exposure images are selected to create a HDR image.

When capturing HDR images using ME imaging systems, or any HDR imaging system using sequential exposures, a moving object will be registered at different pixel positions in each exposure. If one of the exposure times in an ME image capture is long relative to the motion of the scene or objects in the scene, object shapes will appear blurred and elongated in the direction of motion in the long exposure image. When the images are combined using conventional multiple exposure HDR image combination methods, the discrepancy in position and shape of a moving object in the multiple exposures will result in misregistration of the object in the combined HDR image.

It would therefore be desirable to provide improved methods of motion-corrected image combination for high-dynamic-range imaging devices.

DETAILED DESCRIPTION

Imaging systems are widely used in electronic devices such as digital cameras, computers, cellular telephones, and other electronic devices. These electronic devices may include image sensors that gather incoming light to capture an image. The image sensors may include at least one image pixel array. The pixels in the image pixel array may include photosensitive elements such as photodiodes that convert the incoming light into digital data. Image sensors may have any number of pixels (e.g., hundreds or thousands or more). A typical image sensor may, for example, have hundreds of thousands or millions of pixels (e.g., megapixels).

Figure 1:
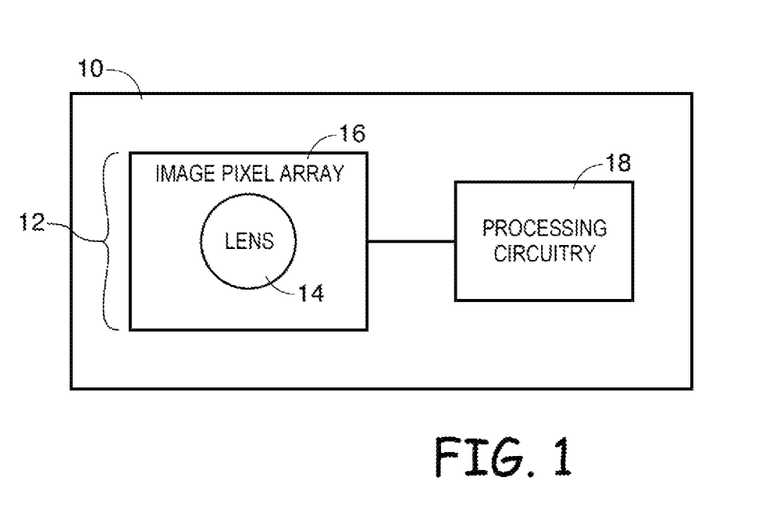
FIG. 1 shows an illustrative imaging device that can be used to capture high-dynamic-range images in accordance with an embodiment of the present invention.

FIG. 1 is a diagram of an illustrative electronic device that uses an image sensor to capture images. Device 10 may be a portable electronic device such as a camera, a cellular telephone, a video camera, or other imaging device that captures imaging data. Device 10 may include at least one camera module 12. Camera module 12 may include an array of image pixels such as image pixel array 16 in which pixels are arranged in pixel rows and pixel columns or in other suitable arrangements. Camera module 12 may include lens 14 for focusing image light from a real-world scene onto image pixel array 16. Camera module 12 may provide image data to processing circuitry 18.

Processing circuitry 18 may include one or more integrated circuits (e.g., image processing circuits, microprocessors, storage devices such as random-access memory and non-volatile memory, etc.) and may be implemented using components that are separate from image pixel array 16 and/or that form part of image pixel array 16 (e.g., circuits that form part of an integrated circuit that controls or reads pixel signals from image pixel array 16 or an integrated circuit within pixel array 16). Image data that has been captured by image pixel array 16 may be processed and stored using processing circuitry 18. Processed image data may, if desired, be provided to external equipment (e.g., a computer or other device) using wired and/or wireless communications paths coupled to processing circuitry 18.

Dynamic range may be defined as the luminance ratio of the brightest element in a given scene to the darkest element the given scene. Typically, cameras and other imaging devices capture images having a dynamic range that is smaller than that of real-world scenes. HDR imaging systems are therefore required to capture representative images of scenes that have regions with high contrast, such as scenes that have portions in bright sunlight and portions in dark shadows.

An image may be considered an HDR image if it has been generated using imaging processes or software processing designed to increase dynamic range. As an example, HDR images may be captured by a digital camera using a multiple integration (or multiple exposure (ME)) method. In particular, multiple images of the same scene may be captured using different exposure (or integration) times. A short-exposure image captured during a short integration time may better capture details of brightly lit portions of the scene, whereas a long-exposure image captured during a relatively longer integration time may better capture details of dark portions of the scene. The short-exposure and long-exposure images may be combined into a composite HDR image that accurately represents the brightly lit as well as the dark portions of the image.

Some HDR imaging systems use frame-sequential exposures in which an entire image frame is captured (i.e., all pixels accumulate image data) before the subsequent image frame is captured. Other HDR imaging systems use row-sequential exposures in which a selection of pixel rows capture an image of a portion of a scene (i.e. a portion of an image frame) and the same selection of pixel rows is used to capture a second image of the same portion of the scene before subsequent rows are used to repeat the multiple exposure imaging process.

When capturing HDR images using frame-sequential or row-sequential ME imaging methods, or any HDR imaging system using sequential exposures, a moving object will be registered at different pixel positions in each exposure. In a long-exposure image (i.e. images captured with an exposure time that is longer than the exposure time of a corresponding short-exposure image), motion of the scene or objects in the scene may cause object shapes to appear blurred and elongated in the direction of motion in the long-exposure image. When the images are combined using conventional multiple exposure HDR image combination methods, the discrepancy in position and shape of a moving object in the multiple exposures will result in misregistration of the object in the combined HDR image. Common ME imaging systems use a Bayer color filter patterned image sensor. Combing multiple exposure images in the Bayer domain misregistered objects not only causes shape distortion but also cause severe color distortion of objects in combined HDR images.

Figure 2A:
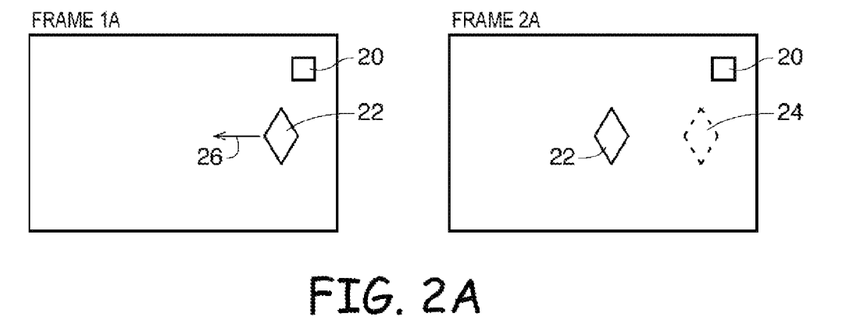
FIG. 2A is an illustrative diagram of two multiple exposure image frames containing a moving object and a stationary object of the type that may be captured using an imaging system of the type shown in FIG. 1 in accordance with an embodiment of the present invention.

FIG. 2A is an illustrative diagram of two multiple exposure images captured using (for example) image pixel array 16 of FIG. 1. In the example of FIG. 2A, image frame 1A may contain objects such as stationary object 20 and moving object 22. Moving object 22 may be moving in direction 26. Image frame 1A may contain more or less than two objects, more or less than one moving object, or may contain more or less than one stationary object. As shown in FIG. 2A, moving object 22 has changed position during the time between the capture of image frame 1A and image frame 2A. The position of moving object 22 at the time frame 1A was captured (as indicated by dashed line 24 in frame 2A) is empty in frame 2A. Moving object 22 occupies a different position from position 24 in frame 2A. A conventional combination of image frame 1A and image frame 2A will result in two copies of moving object 22 in the combined image.

Figure 2B:
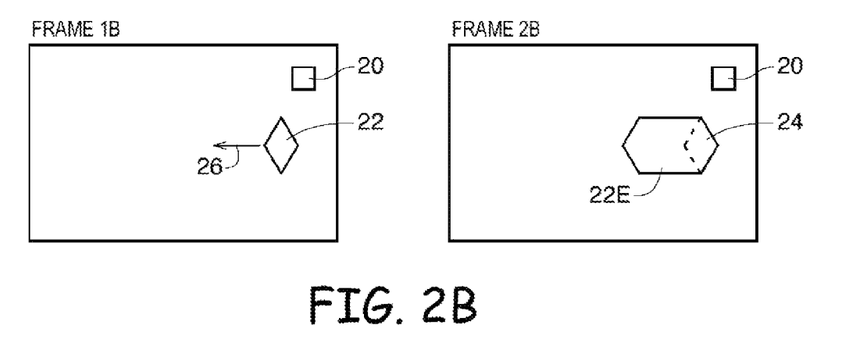
FIG. 2B is an illustrative diagram of two multiple exposure image frames including a long-exposure image and a short-exposure image containing a moving object and a stationary object of the type that may be captured using an imaging system of the type shown in FIG. 1 in accordance with an embodiment of the present invention.

FIG. 2B is an illustrative diagram of two multiple exposure images containing stationary object 20 and moving object 22 (moving in direction 26). In the example of FIG. 2B, image frame 1B is a short-exposure image and image 2B is a long-exposure image. Due to the longer exposure time (relative to the motion of the object across the image) used to capture long-exposure image frame 2B, moving object 22 appears in image frame 2B as elongated object 22E. This is because moving object 22 changed position during the capture of image frame 2B. As shown in FIG. 2B, elongated object 22E partially occupies original position 24 of image frame 2B. A conventional combination of image frame 1B and image frame 2B will result in an elongated, distorted image of moving object 22 in a combined HDR image. Image frames 2A and 2B may be Bayer color images of objects 20 and 22. A conventional combination of Bayer color images such as frames 1B and 2B may result in an image of moving object 22 that suffers from color distortion (i.e. incorrect mixing of color image pixels from frames 1B and 2B) in addition to spatial distortion and elongation.

Figure 2C:
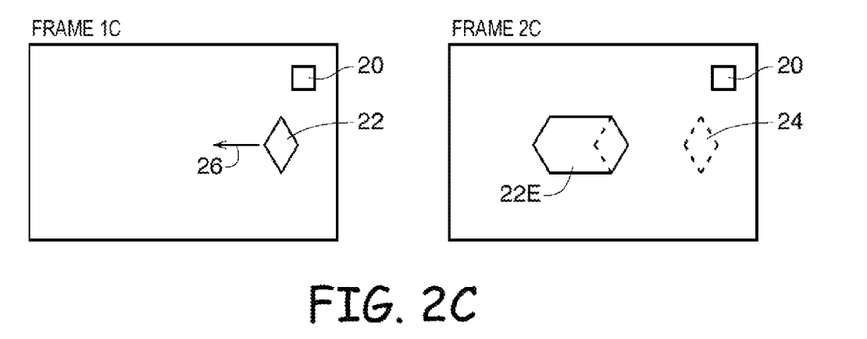
FIG. 2C is an illustrative diagram of two multiple exposure image frames including a long-exposure image and a short-exposure image containing a moving object and a stationary object of the type that may be captured using an imaging system of the type shown in FIG. 1 in accordance with an embodiment of the present invention.

FIG. 2C is an illustrative diagram of a short-exposure and a long-exposure image containing stationary object 20 and moving object 22 (moving in direction 26). As shown in FIG. 2C, moving object 22 has changed position during the time between the end of the capture of short-exposure image frame 1C and the start of the capture of long-exposure image frame 2C. Moving object 22 has also moved during the capture of image frame 2C. The position of moving object 22 at the time frame 1C was captured (as indicated by dashed line 24 in frame 2C) is empty in frame 2C. Moving object 22 occupies a different position from position 24 in frame 1B. In addition, due to the longer exposure time used to capture long-exposure image frame 2C, moving object 22 also appears in image frame 2C as elongated object 22E. A conventional combination of image frame 1C and image frame 2C to form an HDR image will result in two copies of moving object 22 in the combined image. In addition, one of the two copies of moving object 22 in the combined HDR image will appear as elongated object 22E. Elongated object 22E may suffer from elongation, distortion, and color distortion (e.g., if image frames 1C and 2C were captured using an image sensor having a Bayer color filter or other mixed color filter array).

FIGS. 2A, 2B, and 2C show horizontal motion and distortion of moving object 22. In practice, the motion of moving object 22 may be in any direction relative to the field of view of camera module 12. The distortion of elongated moving object 22E may be in any direction relative to the orientation of image pixel array 14. Moreover, the distortion of moving object 22 may be more complex than that shown in FIGS. 2A, 2B, and 2C. For example, image frames 1C and 2C may be captured using a row-sequential ME image capture method or a rolling shutter scheme in which multiple exposures of a pixel row or group of pixel rows are executed before executing multiple exposures of another pixel row or group of pixel rows. In the example of a row-sequential ME image capture, the distortion of elongated moving object 22E may be discontinuous across the image of moving object 22E (i.e., a portion of elongated object 22E may be shifted with respect to another portion of elongated object 22E).

Figure 3:
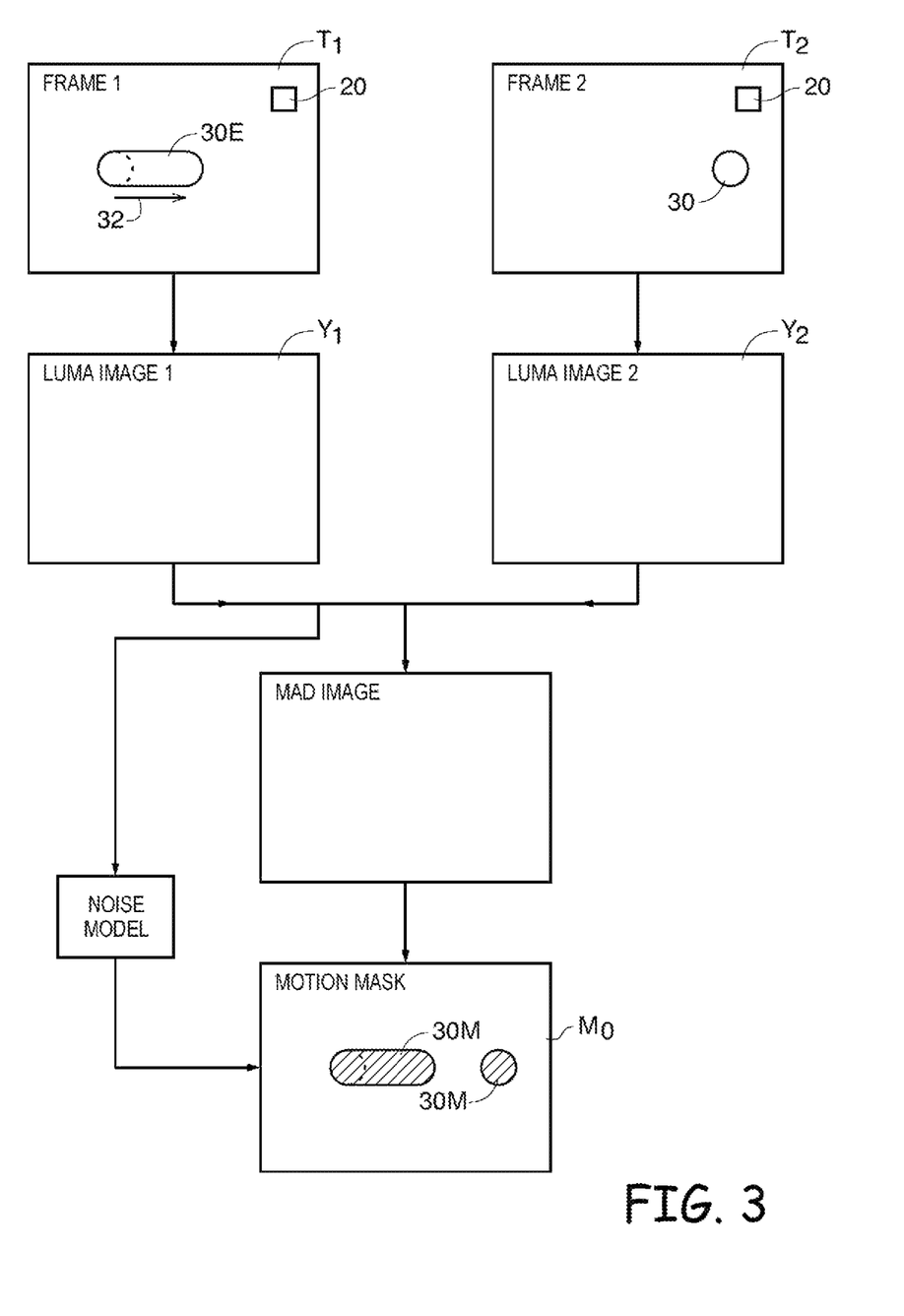
FIG. 3 is an illustrative diagram of a method of combing multiple exposure images to generate a motion mask in accordance with an embodiment of the present invention.

FIG. 3 is a diagram of an illustrative method of creating a motion mask from two sequential image frames such as frames $T_1$ and $T_2$. Image frames $T_1$ and $T_2$ may be captured using an image pixel array such as image pixel array 16 of FIG. 1. As shown in FIG. 3, image frames $T_1$ and $T_2$ contain stationary object 20 and moving object 30, moving in direction 32. Image frame $T_1$ may have an exposure time t1 that is longer than the exposure time t2 of image frame $T_2$. Due to the long exposure time of frame $T_1$ relative to the motion of object 30 (i.e., object 30 moves across a non-negligible number of image pixels during the exposure time of image frame $T_1$), image frame $T_1$ may contain an elongated or distorted image of moving object 30 such as elongated image 30E.

A motion mask may be an array of values, each value corresponding to a single image pixel in image frame $T_1$ and image frame $T_2$. Each array value in the motion mask may indicate the likelihood of the corresponding pixel in either image frame $T_1$ or image frame $T_2$ containing a moving object (e.g., a value of 1 may indicate a pixel containing a moving object while a value of 0 may indicate a pixel does not contain a moving object).

A method for producing a motion mask from two sequential image frames may, as shown in FIG. 3, include generating luma images $Y_1$ and $Y_2$ from image frames $T_1$ and $T_2$, respectively. A luma image may be computed using processing circuitry 18 of FIG. 1 by convolving each image frame with a luma operator (e.g., a high-pass filter). For example, image frame $T_1$ and image frame $T_2$ may be convolved with the operator h, where:

$$h = \begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix} / 256, \qquad (1)$$

according to the following equation:

$$Y(x,y) = h * T(x,y), \qquad (2)$$

where $Y(x,y)$ is the value of pixel $(x,y)$ in luma image Y (e.g., luma images $Y_1$ and $Y_2$) and $T(x,y)$ is the value of pixel $(x,y)$ in image frame T (e.g., image frames $T_1$ and $T_2$, respectively).

Luma images $Y_1$ and $Y_2$ may be combined to a mean-absolute-difference (MAD) image by computing, for each pixel, the MAD of a surrounding group of pixels in luma images $Y_1$ and $Y_2$. For example, the pixel $(x,y)$ value of the MAD image $(MAD(x,y))$ may be computed using the pixels in an m×n group of pixels (where m and n may have any integer value) such as a five-by-five window surrounding pixel $(x,y)$:

$$MAD(x,y) = \sum_{i,j} |Y_1(i,j) - R \cdot Y_2(i,j)|/25, \qquad (4)$$

where R is the exposure ratio (i.e., the ratio of the long-exposure integration time to the short-exposure integration time) and $Y_1(i,j)$ is the value of pixel $(i,j)$ of luma image $Y_1$ and $Y_2(i,j)$ is the value of pixel $(i,j)$ of luma image $Y_2$. The MAD image may then be combined with a noise model to generate the motion mask. The noise model may be based on one or both image frames $T_1$ and $T_2$, may be based on one or both luma images $Y_1$ and $Y_2$, may be based on a combination of image frames $T_1$ and $T_2$ and luma images $Y_1$ and $Y_2$, or may be based on a combination of pixels from one of image frames $T_1$ and $T_2$ or luma images $Y_1$ and $Y_2$. As an example, noise dependent thresholds $qq_1$ and $qq_2$ may be determined using the pixel gain:

$$qq_1 = q_1 \cdot \text{gain} \qquad (5)$$

and $$qq_2 = q_2 \cdot \sqrt{\text{gain} \cdot Y_1(x,y)} + qq_1 \qquad (6)$$

where gain is a multiplicative factor applied to the raw accumulated charge in a pixel to produce an image pixel value, and where $q_1$ and $q_2$ are chosen parameters. In one preferred embodiment, $q_1=60$ and $q_2=12$ may be used.

Alternatively, long-exposure image $T_1(x,y)$ may replace luma image $Y_1(x,y)$ in equation 6. In another example, the average value of all green pixels in a window (e.g., a 5×5 window of pixels surrounding pixel $(x,y)$) may be used for each $(x,y)$ value in equation 6. Once a noise model (e.g., thresholds $qq_1$ and $qq_2$) has been chosen, motion mask $M_0$ may be computed using processing circuitry 18 as follows:

$$M_0(x,y) = \min(qq_2 - qq_1, \max(0, MAD(x,y) - qq_1))/(qq_2 - qq_1). \qquad (7)$$

As shown in FIG. 3, motion mask $M_0$ has non-zero values in pixels corresponding to pixels in image frames $T_1$ and $T_2$ containing moving object 30. The pixels in motion mask $M_0$ having non-zero values are indicated by motion regions 30M.

Figure 4A:
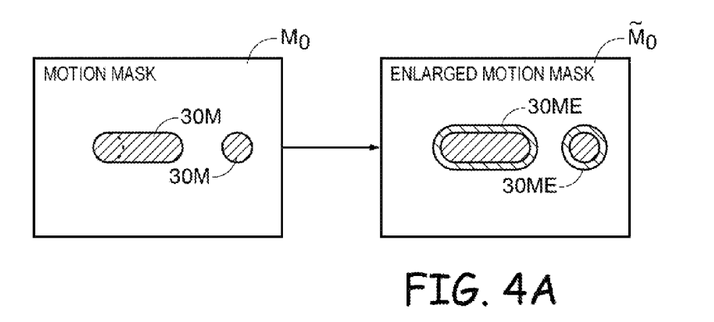
FIG. 4A is an illustrative diagram of a method of generating an enlarged motion mask from a motion mask in accordance with an embodiment of the present invention.

As shown in FIG. 4A, an enlarged motion mask may be generated from motion mask $M_0$. As stated above in connection with FIG. 3, each value $M_0(x,y)$ may indicate the likelihood of the corresponding pixel $(x,y)$ in image frames $T_1$ and $T_2$ containing a moving object. Motion mask $M_0$ may contain continuous values between 0 and 1. If desired, the values $M_0(x,y)$ may be quantized using a floor operator:

$$M_0(x,y) = \text{floor}(M_0(x,y) \cdot 256). \qquad (8)$$

Following application of the floor operator as in equation 8, motion mask $M_0$ contains zero values in all pixels other than pixels in motion regions 30M. Pixel values in motion regions 30 may contain integer values between 0 and 256.

Enlarged motion mask $\tilde{M}_0$ may be computed by replacing values $M_0(x,y)$ with the maximum value in a window $W_{x,y}$ surrounding pixel $(x,y)$:

$$\tilde{M}_0(x,y) = \max_{i,j \in W_{x,y}} (M_0(i,j)). \qquad (9)$$

For example, a 5×1 window $W_{x,y}$ (i.e., a set of pixels with a width of 5 pixels and a height of 1 pixel) or other window may be used. Following application of the maximum function as described in equation 9, enlarged motion mask $\tilde{M}_0$ may contain zero values in all pixels outside of enlarged motion regions 30ME and non-zero pixel values in pixel within enlarged motion regions 30ME.

Figure 4B:
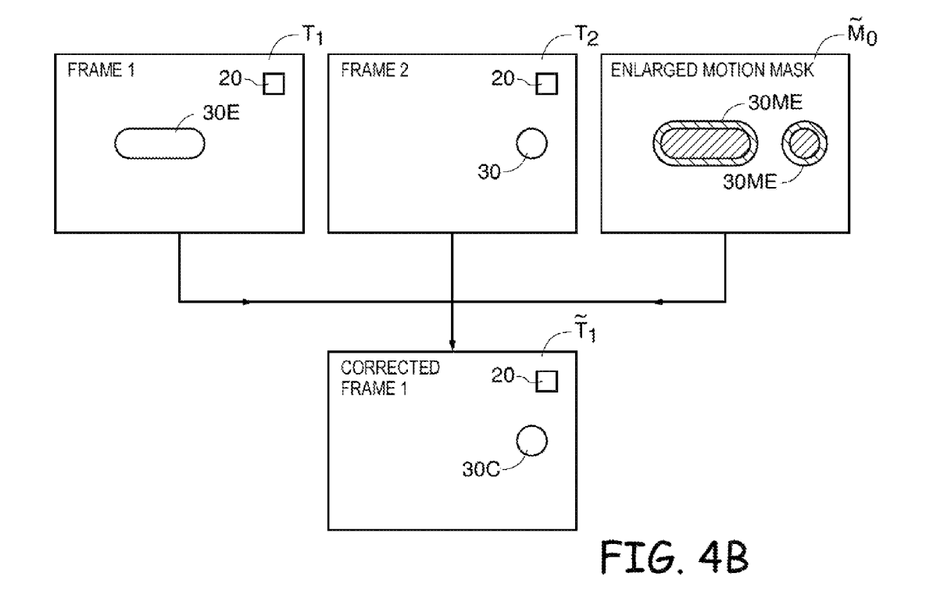
FIG. 4B is an illustrative diagram of a method of combing multiple exposure image frames with an enlarged motion mask to generate a corrected image in accordance with an embodiment of the present invention.

FIG. 4B is an illustrative diagram of a method for generating a corrected long-exposure image such as corrected long-exposure image $\tilde{T}_1$ by combining long-exposure image $T_1$, short-exposure image $T_2$ and enlarged motion mask $\tilde{M}_0$. In one embodiment, values of pixels in image frame $T_1$ corresponding to non-zero pixels (i.e. in enlarged motion regions 30ME) in enlarged motion mask $\tilde{M}_0$ may be replaced by the values of corresponding pixels in short-exposure image $T_2$ multiplied by exposure ratio R. As shown in FIG. 4B, long-exposure image $T_1$ may contain stationary object 20 and elongated moving object 30E, short-exposure image $T_2$ may contain stationary object 20 and moving object 30, and enlarged motion mask $\tilde{M}_0$ may contain enlarged motion regions 30ME having non-zero pixel values corresponding to the positions of object 30 (elongated in image frame $T_1$) in frames $T_1$ and $T_2$. Corrected long-exposure image $\tilde{T}_1$ contains stationary object 20 and corrected image 30C of moving object 30.

In another embodiment, the values of pixels image frame $T_1$ corresponding to pixels in enlarged motion regions 30M may be replaced by the values of corresponding pixels in short-exposure image $T_2$ using a soft-switching function:

$$\tilde{T}_1(x,y)=[(256-\tilde{M}_0(x,y))\cdot T_1(x,y)+\tilde{M}_0(x,y)\cdot R\cdot T_2(x,y)]/256. \qquad (9)$$

Generating corrected long-exposure image $\tilde{T}_1$ using the soft-switching function of equation 9 may help avoid hard transitions (i.e., visible edges) between regions in corrected long-exposure image $\tilde{T}_1$ corresponding to pixels inside and outside of enlarged motion regions 30ME. Alternatively, motion mask $M_0$ may be used in place of enlarged motion mask $\tilde{M}_0$ in equation 9.

Figure 5:
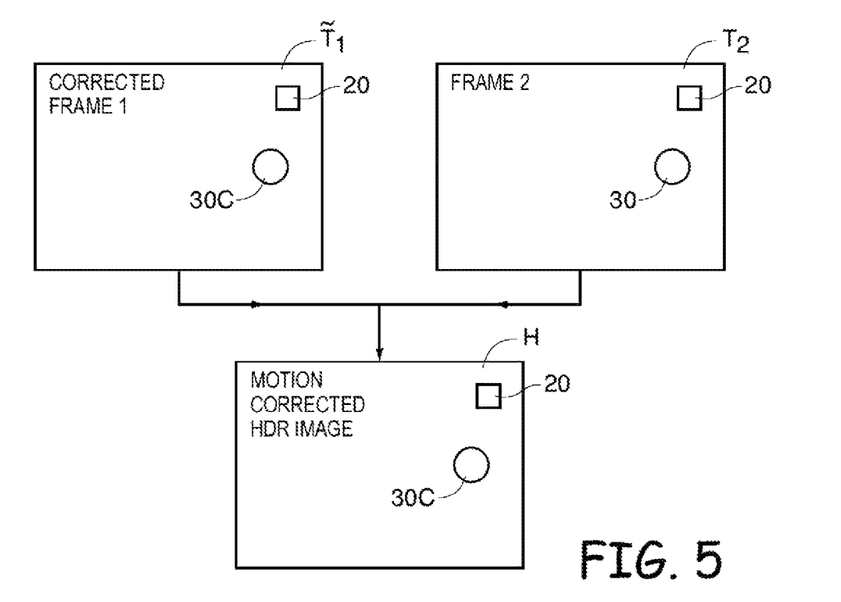
FIG. 5 is an illustrative diagram of a method of combing a multiple exposure image frame with a corrected image to generate a motion-corrected high-dynamic-range image in accordance with an embodiment of the present invention.

FIG. 5 is a diagram of an illustrative method of generating a motion-corrected HDR image in accordance with an embodiment of the present invention. As shown in FIG. 5, motion-corrected HDR image H may be generated using processing circuitry 18 by combining corrected long-exposure image $\tilde{T}_1$ and short-exposure image $T_2$. As described in connection with FIGS. 3 and 4B, corrected long-exposure image $\tilde{T}_1$ may contain stationary object 20 and corrected moving object 30C while short-exposure image $T_2$ may contain stationary object 20 and moving object 30. Each pixel (x,y) in motion-corrected HDR image H may be determined using any linear combination of the pixel values in corrected long-exposure image $\tilde{T}_1$ and short-exposure image $T_2$. In one preferred embodiment, the values of pixels (x,y) in motion-corrected HDR image H may be determined using the following equation:

$$H(x, y) = \begin{cases} \tilde{T}_1(x, y), & \text{if } \tilde{T}_1(x, y) < S_1 \\ R \cdot T_2(x, y), & \text{if } \tilde{T}_1(x, y) > S_2 \\ [(S_2 - \tilde{T}_1(x, y)) \cdot \tilde{T}_1 + (\tilde{T}_1(x, y) - S_1) \cdot R \cdot T_2(x, y)]/(S_2 - S_1), \end{cases} \qquad (10)$$

otherwise, where R is the exposure ratio and where $S_1$ and $S_2$ are the knee points for the HDR linear combination. In one preferred embodiment, $S_1$ and $S_2$ may be chosen such that $S_1=S_2-S_{21}$ (e.g., $S_2=3900$ and $S_{21}=1024$).

Figure 6:
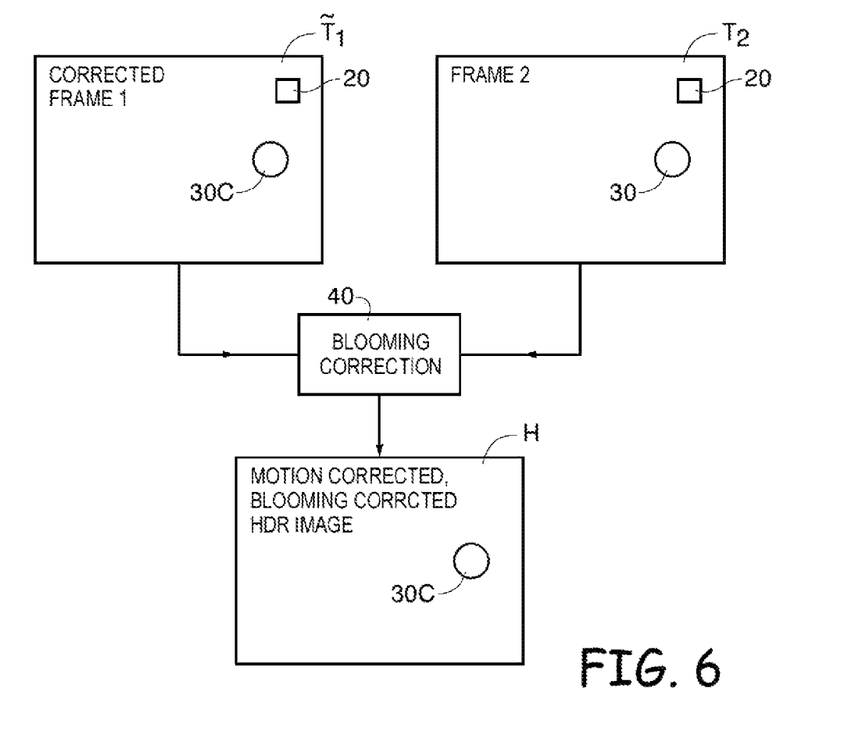
FIG. 6 is an illustrative diagram of a method of combing a multiple exposure image frame with a corrected image with a blooming correction step to generate a motion-corrected high-dynamic-range image in accordance with an embodiment of the present invention.

FIG. 6 is a diagram of another embodiment of a method for combining corrected long-exposure image $\tilde{T}_1$ and short-exposure image $T_2$ to generate motion-corrected HDR image H. In the example of FIG. 6, an additional blooming correction is applied during the combination of long-exposure image $\tilde{T}_1$ and short-exposure image $T_2$. As described in connection with FIGS. 3 and 4B, corrected long-exposure image $\tilde{T}_1$ may contain stationary object 20 and corrected moving object 30C while short-exposure image $T_2$ may contain stationary object 20 and moving object 30.

In a conventional CMOS image sensor, blooming charge from saturated pixels into neighboring non-saturated pixels (e.g., due to overexposure of a photosensor to light) often causes a non-linear response to light in the saturated and neighboring non-saturated pixels). Due to this non-linear response and blooming charges, in a CMOS image sensor using a Bayer color filter or other patterned color filter, blooming in a long-exposure image may result in color artifacts in combined HDR images. Color artifacts may be propagated or may be exaggerated during image combination during generation of motion-corrected HDR images (as in equation 10). As shown in FIG. 6, a blooming correction may be applied during image combination. Blooming correction operation 40 may use processing circuitry 18 to identify saturated pixels in long-exposure image frame $T_1$ and replace the saturated pixel values with pixel values in short-exposure image frame $T_2$. Blooming correction method 40 may also replace pixel values in pixels neighboring saturated values, even if their long-exposure value isn't saturated. In one preferred embodiment, the booming correction may be applied by selecting L(x,y) to be the maximum pixel value in a p×q window of pixels (e.g., a p=3×q=3, p=3×q=1 or other window of pixels where p and q have integer values) centered on pixel (x,y). Blooming correction operation 40 may then use maximal window value L(x,y) as a comparison value in a soft-switching linear combination of corrected long-exposure image $\tilde{T}_1$ and short-exposure image $T_2$:

$$H(x, y) = \begin{cases} \tilde{T}_1(x, y), & \text{if } L(x, y) < S_1 \\ R \cdot T_2(x, y), & \text{if } L(x, y) > S_2 \\ [(S_2 - L(x, y)) \cdot \tilde{T}_1 + (L(x, y) - S_1) \cdot R \cdot T_2(x, y)]/(S_2 - S_1), \end{cases} \qquad (11)$$

otherwise, where, as described in connection with equation 10, R is the exposure ratio and where $S_1$ and $S_2$ are knee points for the HDR linear combination. In one preferred embodiment, $S_1$ and $S_2$ may be chosen such that $S_1=S_2-S_{21}$ (e.g., $S_2=3900$ and $S_{21}=1024$).

Figure 7:
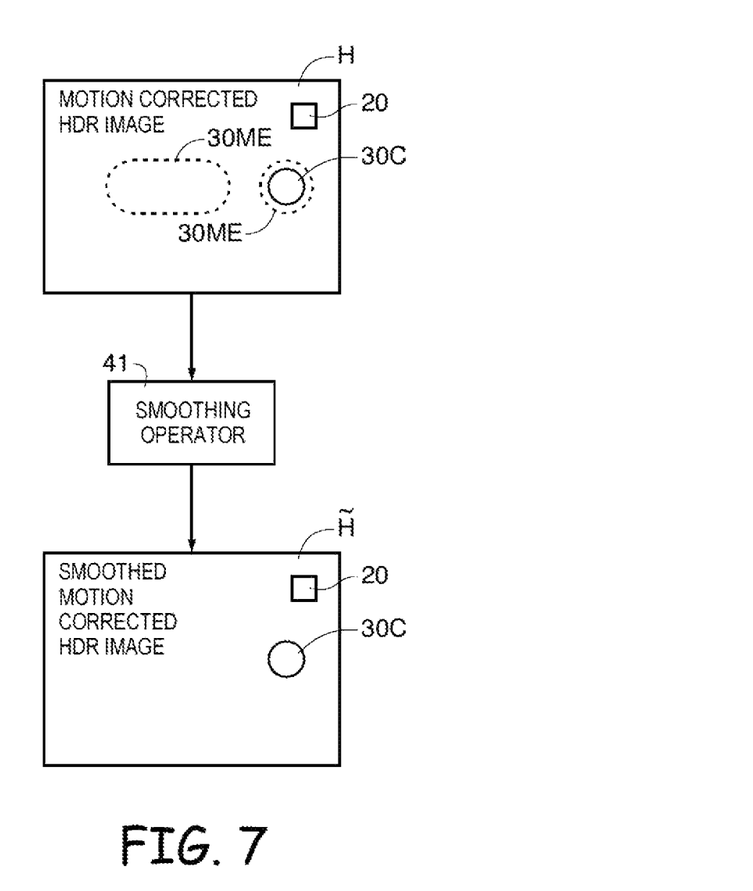
FIG. 7 is an illustrative diagram of a method of improving motion-corrected high-dynamic-range images by smoothing motion masked regions of the motion-corrected high-dynamic-range image in accordance with an embodiment of the present invention.

FIG. 7 is an illustrative diagram of an additional step in generating motion-corrected HDR images that includes a smoothing operation applied to motion-corrected HDR image H. Smoothed motion-corrected HDR image $\tilde{H}$ may be generated by convolving motion regions of motion-corrected HDR image H with smoothing operator 41. Smoothing operator 41 may be a one-dimensional smoothing filter or other smoothing filter. As an example, smoothing filter 41 may be a five-tab filter such as g=[1/3,0,1/3,0,1/3]. Smoothing operator 41 may be applied to all pixels of motion-corrected HDR image H to produce a filtered image motion-corrected HDR image f(H), where f(H)=g*H (i.e. motion-corrected HDR image H convolved with smoothing filter g).

In another embodiment, smoothed motion-corrected HDR image $\tilde{H}$ may be generated in a smoothing operation such that filter g (i.e., smoothing operator 41) is only applied to pixels in motion regions 30M or in enlarged motion regions 30ME. Smoothing operator 41 may be applied only to enlarged motion regions 30ME using soft-switching filter operation using enlarged motion mask $\tilde{M}_0$. The soft-switching filter operation uses soft-switching function β to scale the level of filtering of each pixel based on enlarged motion mask $\tilde{M}_0$ as shown in the following equation:

$$\tilde{H}(x,y)=\beta(x,y)\cdot f(H)(x,y)+(1-\beta(x,y))\cdot H(x,y), \qquad (12)$$

where, $$\beta(x,y)=\min(d_2-d_1,\max(0,\tilde{M}_0(x,y)-d_1))/(d_2-d_1) \qquad (13)$$

and where $d_1$ and $d_2$ are two threshold parameters for the soft-switching function. In one example, $d_2=256$ and $d_1=d_2-64$.

Various embodiments have been described illustrating methods which may be provided for high-dynamic-range imaging systems for generating motion-corrected HDR images of a scene containing a moving object. The motion-correction method may include using an image sensor to capture subsequent first and second images that include the moving object and using processing circuitry to generate a motion mask. The first image may be captured during a first exposure time and the second image may be captured during a second exposure time. The first exposure time may be longer than the second exposure time.

The method may include using processing circuitry to produce luma images from the first and second images by convolving the first and second images with a high-pass filter. The luma images may be combined to produce a mean-absolute-difference image by combining pixel values of an m×n group of pixels in the first and second luma images into a single mean-absolute-difference image pixel value by performing computations that include the pixel values of the m×n group of pixels.

The motion mask may have non-zero pixel values in a motion region that corresponds to portions of the first image that include the moving object and portions of the second image that include the moving object. The motion mask may have pixels with values equal to zero outside the motion region. The method may include generating an enlarged motion mask including an enlarged motion region that is larger than the motion region in the motion mask. The method may also include generating a corrected image by linearly combining the first and second images multiplied by the motion mask and generating a motion-corrected high-dynamic-range image based on a linear combination of the corrected image and the second image multiplied by the ratio of the first exposure time to the second exposure time.

If desired, the corrected image may be produced using a soft-switching function so that the corrected image includes a first region having exclusively pixel data from the first image, a second region having exclusively pixel data from the second image, and a transition region having pixel data based on data from the first image and the second image.

The generation of the motion-corrected high-dynamic-range image may include linearly combing the corrected image and the second image in a process in which the data for the each pixel of the motion-corrected high-dynamic-range is selected based on a comparison of a single pixel value from the first corrected image to first and second knee point values.

Alternatively, the generation of the motion-corrected high-dynamic-range image may include performing a blooming correction operation during the linear combination of the corrected image and the second image in which the data for the each pixel of the motion-corrected high-dynamic-range is selected based on a comparison of the maximum pixel value in a p×q group of pixels surrounding each pixel from the first corrected image to first and second knee point values.

The method may further include performing a smoothing operation on the motion-corrected high-dynamic-range image using processing circuitry. The smoothing operation may include smoothing pixel data in portions of the motion-corrected high-dynamic-range image corresponding to the motion region of the motion mask without smoothing pixel data in other portions of the motion-corrected high-dynamic-range image corresponding to regions outside the motion region of the motion mask. Smoothing the pixel data may include applying a soft-switching filter operation to the pixel data during smoothing the operation in which a smoothed motion-corrected high-dynamic-range image having a first region having exclusively smoothed pixel data, a second region having exclusively unsmoothed pixel data, and a transition region having pixel data based on smoothed and unsmoothed pixel data is generated.

The foregoing is merely illustrative of the principles of this invention which can be practiced in other embodiments.

What is claimed is:

1. A method of using an image sensor and processing circuitry in an electronic device to generate a motion-corrected high-dynamic-range image of a scene containing a moving object, the method comprising:
   with the image sensor, capturing first and second images that include the moving object;
   with the processing circuitry, generating a motion mask, wherein the motion mask has non-zero pixel values in a motion region that corresponds to portions of the first image that include the moving object and portions of the second image that include the moving object and wherein the motion mask has pixels with values equal to zero outside the motion region;
   with the processing circuitry, generating a first corrected image by linearly combining the first and second images multiplied by the motion mask; and
   with the processing circuitry, generating a motion-corrected high-dynamic-range image based on a linear combination of the first corrected image and the second image.

2. The method defined in claim 1 wherein generating the motion-corrected high-dynamic-range image comprises performing a blooming correction operation with the processing circuitry.

3. The method defined in claim 2 further comprising:
   performing a smoothing operation on the motion-corrected high-dynamic-range image using the processing circuitry.

4. The method defined in claim 3 wherein performing the smoothing operation comprises smoothing pixel data in portions of the motion-corrected high-dynamic-range image corresponding to the motion region of the motion mask without smoothing pixel data in other portions of the motion-corrected high-dynamic-range image corresponding to regions outside the motion region of the motion mask.

5. The method defined in claim 3 wherein smoothing the pixel data comprises applying a soft-switching filter operation to the pixel data during smoothing the operation.

6. The method defined in claim 5, wherein applying the soft-switching filter operation to the pixel data during the smoothing operation comprises using the soft-switching filter operation to generate a smoothed motion-corrected high-dynamic-range image having a first region having exclusively smoothed pixel data, a second region having exclusively unsmoothed pixel data, and a transition region having pixel data based on smoothed and unsmoothed pixel data.

7. The method defined in claim 6 wherein generating the first corrected image by linearly combining the first and second images multiplied by the motion mask comprises combining the first and second images using a soft-switching function so that the first corrected image includes a first region having exclusively pixel data from the first image, a second region having exclusively pixel data from the second image, and a transition region having pixel data based on data from the first image and the second image.

8. A method of using an image sensor and processing circuitry in an electronic device to generate a motion-corrected high-dynamic-range image of a scene containing a moving object, the method comprising:
   with the image sensor, capturing first and second images that include the moving object;
   with the processing circuitry, producing a mean-absolute-difference image from the first and second images;
   with the processing circuitry, generating a motion mask using the mean-absolute-difference image, wherein the motion mask has non-zero pixel values in a motion region that corresponds to portions of the first image that include the moving object and portions of the second image that include the moving object, and wherein the motion mask has pixels with values equal to zero outside the motion region; and with the processing circuitry, generating a first corrected image by linearly combining the first and second images multiplied by the motion mask.

9. The method defined in claim 8 further comprising:
with the processing circuitry, generating a motion-corrected high-dynamic-range image based on a linear combination of the first corrected image and the second image.

10. The method defined in claim 9 wherein producing the mean-absolute-difference image comprises:
with the processing circuitry, generating first and second luma images from the first and second images respectively by convolving the first and second images with a high-pass filter; and
combining pixel values of an m×n group of pixels in the first and second luma images into a single mean-absolute-difference image pixel value by performing computations that include the pixel values of the m×n group of pixels with the processing circuitry.

11. The method defined in claim 9 further comprising:
generating an enlarged motion mask from the motion mask, wherein the enlarged motion mask includes an enlarged motion region that is larger than the motion region in the motion mask.

12. The method defined in claim 8 wherein generating the first corrected image comprises combining the first and second images using a soft-switching function so that first corrected image includes a first region having exclusively pixels from the first image, a second region having exclusively pixels from the second image, and a transition region having pixels with values based on data from the first image and the second image.

13. The method defined in claim 12 further comprising:
with the processing circuitry, generating a motion-corrected high-dynamic-range image based on a linear combination of the first corrected image and the second image.

14. The method defined in claim 13 wherein generating the motion-corrected high-dynamic-range image comprises performing a blooming correction operation with the processing circuitry.

15. A method of using an image sensor and processing circuitry in an electronic device to generate a high-dynamic-range image of a scene containing a moving object, the method comprising:
with the image sensor, capturing first and second images that include the moving object;
with the processing circuitry, generating first and second luma images based on the first and second images respectively;

with the processing circuitry, generating at least one noise dependent threshold based on the first luma image;
with the processing circuitry, generating a mean-absolute-difference image based on the first and second luma images;
with the processing circuitry, generating a motion mask based on the mean-absolute-difference image and the at least one noise dependent threshold, wherein the motion mask has non-zero pixel values in a motion region that corresponds to portions of the first image that include the moving object and portions of the second image that include the moving object and wherein the motion mask has pixels with values equal to zero outside the motion region; and
with the processing circuitry, generating a first corrected image based on the first image, the second image, and the motion mask.

16. The method defined in claim 15 wherein capturing first and second images that include the moving object comprises capturing the first image during a first exposure time and capturing the second image during a second exposure time, wherein the first exposure time is longer than the second exposure time.

17. The method defined in claim 16 further comprising:
with the processing circuitry, generating a motion-corrected high-dynamic-range image based on a linear combination of the first corrected image and the second image multiplied by the ratio of the first exposure time to the second exposure time.

18. The method defined in claim 15 wherein generating a motion-corrected high-dynamic-range image based on a linear combination of the first corrected image and the second image comprises generating a motion-corrected high-dynamic-range image having a first portion containing exclusively data from the first corrected image, a second portion having exclusively data from the second image, and a third portion having data based on a linear combination of the first image and the second image multiplied by the ratio of the first exposure time to the second exposure time.

19. The method defined in claim 18 wherein generating a motion-corrected high-dynamic-range image based on a linear combination of the first corrected image and the second image comprises selecting data for the first, second, and third portions by comparing each pixel value from the first corrected image to first and second knee point values.

20. The method defined in claim 18 wherein generating a motion-corrected high-dynamic-range image based on a linear combination of the first corrected image comprises selecting data for the first, second, and third portions by comparing the maximum pixel value in a p×q window of pixels surrounding each pixel from the first corrected image to first and second knee point values.

* * * * *